United States Patent Office 3,352,631
Patented Nov. 14, 1967

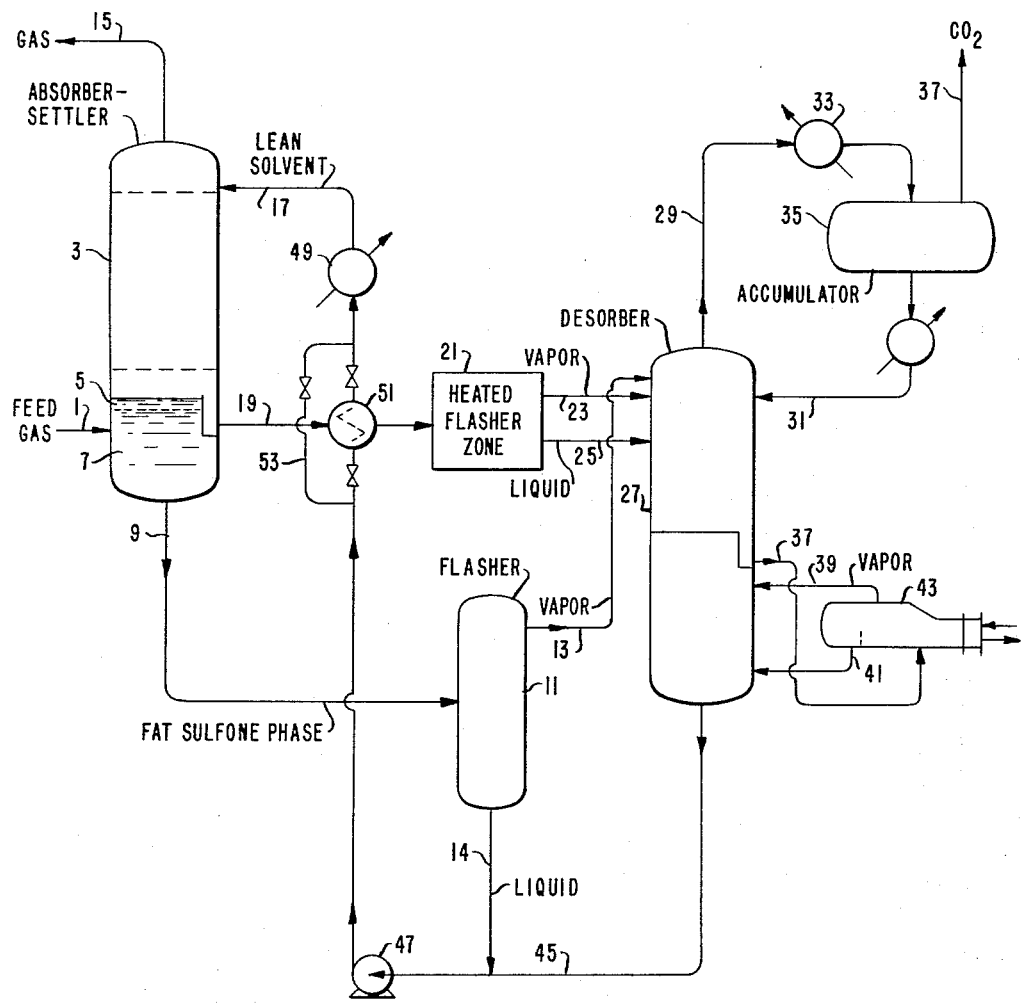

3,352,631
METHOD OF SEPARATING CARBON DIOXIDE
FROM GASEOUS MIXTURES
Keith E. Zarker, Orinda, Calif., assignor to Shell Oil
Company, New York, N.Y., a corporation of Delaware
Filed Jan. 31, 1964, Ser. No. 341,581
10 Claims. (Cl. 23—2)

ABSTRACT OF THE DISCLOSURE

A process for separating carbon dioxide from gaseous mixtures by absorbing the carbon dioxide from the mixture in a liquid absorbent consisting of (a) 5–25% wt. water, (b) 15–60% wt. of monoethanol- or diethanolamine or mixtures thereof and (c) 28–80% wt. of a cyclotetramethylene sulfone (sulfolane). The fat solvent is recovered in two phases (a) a fat amine phase and (b) a fat sulfone phase. The fat sulfone phase is regenerated by reducing the pressure of that phase below the absorption pressure. The fat amine phase is regenerated by reducing the pressure below the absorption pressure and raising the temperature above the absorption temperature. The lean regenerated amine and sulfone phases are combined and recycled for additional absorption.

---

This invention relates to the separation of carbon dioxide from acidic gaseous mixtures containing the same. More particularly, the invention pertains to separation of carbon dioxide from gaseous mixtures by means of a selective absorbent which forms two phases capable of separate regeneration.

The use of certain sulfones such as tetrahydrothiophene 1,1-dioxide and the homologues thereof to purify and dehydrate natural and synthetic gases such as natural gas, synthesis gas, producer gas, coke oven gas, etc. is known in the prior art, for example, see Kamlet, U.S. Patent No. 3,039,251, issued June 19, 1962. While under most conditions, this type of solvent is generally suitable, such as, for example, when it is desired to remove bulk quantities of $CO_2$ from a gaseous mixture containing it, there is at least one situation wherein the use of an absorbent comprising a single sulfone has not proved entirely satisfactory. This refers to the situation wherein it is desirable to remove substantially all of the $CO_2$ present in the particular feed gas. By "substantially all" is meant removal of carbon dioxide to a level so that a product specification of the purified gas of less than 2000 to 200 parts per million, and more particularly less than about 200–500 parts per million carbon dioxide is met. Under such stringent requirements, which must be met for many applications (for example, if the product gas is to be later methanated or utilized in ammonia synthesis), it is usually not feasible to employ a sulfone or any physical solvent alone unless absorption can be conducted under extremely high pressure conditions.

Thus, it has been suggested to utilize other compounds, usually termed "chemical solvents" such as alkanolamines or other compounds whose absorption mechanism involves the formation of salts or other decomposable reaction products which are regenerated by heating. Unfortunately, in many cases this approach has the drawback of requiring large quantities of energy in separating the absorbed acid gas from the absorbent. The amount of heat required for regenerating the absorbent is often a controlling factor in determining the feasibility of a gas purification process and, accordingly, it is essential that it be kept at a minimum.

In accordance with the instant invention, a novel process for absorption of substantially all of the carbon dioxide from gases containing large amounts of carbon dioxide, i.e., as high as from 15 to 50 volume percent is achieved by utilizing a particular mixed solvent and a particular regeneration technique whereby improved heat economies result.

The instant invention is based on the discovery that, when certain specific alkanolamines, namely monoethanolamine and diethanolamine, and water are combined with a cyclotetramethylene sulfone and are employed as an absorbent mixture for removing carbon dioxide from gas mixtures, the absorbent liquid forms two liquid phases, a fat amine phase and a fat sulfone phase which may be separated and separately regenerated.

In other words, the present invention pertains to a process of separating carbon dioxide from a gaseous mixture containing initially from 15 to 50% by volume of carbon dioxide which comprises contacting said mixture in an absorption zone with a liquid absorbent composition comprising from 5 to 20 percent by weight water, from 15–60 percent by weight of either monoethanolamine, diethanolamine, or mixtures thereof and the balance being a cyclotetramethylene sulfone under absorption conditions sufficient to produce an effluent product gas containing less than 2000 parts per million of carbon dioxide; recovering a fat absorbent composition from said absorption zone as two separate liquid phases, a fat amine phase and a fat sulfone phase; separately regenerating said phases by reducing the pressure on said fat sulfone phase to a pressure lower than that maintained in said absorption zone whereby a first reject effluent comprising carbon dioxide is released and a lean sulfone stream is obtained, and by both reducing the pressure to a pressure which is lower than that maintained in said absorption zone and adding heat to said fat amine phase to raise said phase to a temperature which is higher than said absorption zone whereby a second reject effluent comprising carbon dioxide is released and a lean amine stream is obtained; combining said lean amine stream and said lean sulfone stream; and recycling said combined stream to contact additional quantities of said gaseous mixture.

The high carbon dioxide content acid gases which are particularly suitable for treatment are sour natural gases, hydrogen synthesis gases, refinery gases, flue gas, and the like. Generally such gases contain in various amounts such components as hydrogen, nitrogen, methane, ethane, propane, other higher hydrocarbons, water, hydrogen sulfide, mercaptans, carbon dioxide, carbonyl sulfide, etc. Typical examples of specific gaseous mixtures include the following compositions:

*Natural gas (at 1000 pounds per square inch gauge)*

| Component: | Mol percent |
|---|---|
| Carbon dioxide | 47.5 |
| Nitrogen | 0.5 |
| Methane | 41.6 |
| Ethane | 6.2 |
| Propane | 3.0 |
| Isobutane | 0.6 |
| Normal butane | 0.4 |
| Isopentane | 0.1 |
| Normal pentane | 0.1 |

*Hydrogen synthesis gas[1] (at 387 pounds per square inch absolute)*

| Component: | Mol percent |
|---|---|
| Carbon dioxide | 17.98 |
| Carbon monoxide | 0.31 |
| Nitrogen+argon | 20.08 |
| Hydrogen | 61.03 |
| Methane | 0.25 |
| Water | 0.35 |

[1] Recovered from steam methane reforming.

*Ammonia synthesis gas (at 387 pounds per square inch absolute)*

| Component: | Mol percent |
|---|---|
| Carbon dioxide | 33.60 |
| Carbon monoxide | 0.41 |
| Methane | 0.14 |
| Hydrogen | 65.32 |
| Water | 0.24 |
| Nitrogen+argon | 0.29 |

*Refinery hydrogen gas (at 260 pounds per square inch absolute)*

| Component: | Mol percent |
|---|---|
| Carbon dioxide | 20.80 |
| Carbon monoxide | 1.34 |
| Methane | 2.88 |
| Hydrogen | 73.87 |
| Water | 1.11 |

The absorbent mixtures utilized may vary within rather wide ranges of proportions of the various components. For example, when diethanolamine is employed as the amine, any amount from 20 to 60% by weight of the total absorbent composition may be used; and more particularly preferred for most applications is a range of from about 30 to 50% by weight of diethanolamine. On the other hand, monoethanolamine may be satisfactorily employed in amounts ranging from 15 to 50% by weight with a particularly preferred range being 20–40%. Moreover, mixtures of diethanolamine and monoethanolamine may be used having any desired relative proportion, but the total amount of amine employed is usually desired to be within the range of from 15 to 60% by weight. With respect to the other components making up the absorbent composition, water is usually employed in amounts of from 5 to 20% by weight, and the sulfone makes up the balance.

The sulfones which comprise compounds utilized in the process of this invention are based upon cyclotetramethylene sulfone, the basic and preferred species being sulfolane, otherwise referred to as thiophene tetrahydro-1,1-dioxide. Generally, sulfones having the general configuration:

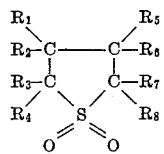

wherein at least four of the R substituents are hydrogen radicals, any remaining R's being alkyl groups having from 1 to 4 carbon atoms each are suitable for use in the instant process.

Suitable derivatives include 2-sulfolene; 2-methyl tetramethylene sulfone; 3-methyl tetramethylene sulfone; 2,3-dimethyl tetramethylene sulfone; 2,4-dimethyl tetramethylene sulfone; 3,4-dimethyl cyclotetramethylene sulfone; 2,5-dimethyl cyclotetramethylene sulfone; 3-ethyl cyclotetramethylene sulfone; 2-methyl-5-propyl cyclotetramethylene sulfone as well as their analogues and homologues. It is preferred that no more than 2 alkyl substituents are appended to the tetramethylene sulfone ring.

A basic step in the process of the invention comprises intimate contacting between the gaseous mixture and the liquid absorbent mixture. Such contacting may occur within wide ranges of temperature and pressure, and pressures in the range of from 0 to 1000 pounds per square inch gauge and even higher are suitable. The particular pressure at which the absorption step is conducted is largely dictated by the pressure of the gaseous mixture to be treated. Similarly the temperature of the absorbent employed is usually dictated by the temperature at which cooling water is available. Generally, the temperature of the lean solvent introduced to the absorption zone is within the range of from about 90 to 130° F., although higher or lower temperatures may be employed. Usually it is preferred that absorption is conducted under "rectified absorption" conditions, i.e., wherein the bottom of the absorption tower has a temperature between about 20 and 150° F. higher than the temperature at the point of introduction of lean absorbent into the absorption zone.

Although countercurrent contacting is preferred in the absorption zone by contacting the downwardly flowing liquid absorbent with upwardly flowing gas, this engineering detail may be varied according to a specific plant design.

The particular absorption contacting apparatus employed is not critical and may be supplied with fractionating plates, sparger, baffles, or other contacting means. It is sometimes convenient to have a liquid-liquid settling zone in the lower portion of the absorption zone to permit the drawoff of the separate phases, the fat amine phase and the fat sulfone phase; however the absorber bottoms may be sent directly to a separate separator vessel if desired.

The relative ratio of amounts of absorbent solution to gaseous mixture to be treated obviously varies with each application depending upon the concentration of carbon dioxide and other acidic constituents which may be present in the gaseous mixture and the concentration of the particular compounds making up the absorbent liquid. In any event there should be enough absorbent liquid employed which will permit the formation of two separate liquid phases by the fat absorbent solution (i.e., the liquid absorbent solution after contact with the gaseous mixture has been effected). While this ratio can, of course, be optimized by routine experimentation, it is generally desirable to employ an absorbent to gaseous mixture such that above about .25 mol of carbon dioxide per mole of amine and more preferably about .3 to .4 mol of $CO_2$ per mol of amine are available.

In regenerating the separate phases, which may be separated in any conventional gravity type separator, it is generally desirable to pass the lighter fat amine phase to a heated flash zone wherein the pressure on the phase is lowered and heat added so that the temperature and pressure correspond approximately to those conditions employed in the stripper. The liquid and vapor recovered are then transported to the stripping zone wherein the residual carbon dioxide remaining in the liquid is recovered by stripping with steam.

On the other hand, the fat sulfone phase need only be flashed to release carbon dioxide contained therein (usually to the pressure at which the stripper is maintained) and does not require addition of external heat. Thus, an important advantage in the instant process results from the fact that the amount of absorbent liquid which must be sent to the stripping zone is substantially less and the amount of heat required is less than would be the case if it were not possible to separate the respective phase for separate regeneration. The latter is the more usual case for many chemical solvent-sulfone combinations including the situation wherein the chemical solvent employed is an amine closely related to diethanolamine and monoethanolamine, such as diisopropanolamine.

The stripping zone conditions may also be within various values of temperature and pressure. Usually the pressure at the bottom of the stripper is maintained between about 0 to 15 pounds per square inch gauge and the bottom temperature is kept between about 240–265° F. although higher and lower values can be employed.

The nature and advantages of the process of the invention will become more apparent to those skilled in the art from consideration of the annexed drawing which consists of a single figure depicting a flow diagram for removal of carbon dioxide from a gas feed wherein a combined absorber settler is utilized.

Referring to the figure, the feed gas enters the lower portion of the absorber-settler 3 by means of line 1 which optionally is equipped with a sparger (not shown) to permit initial intimate contact with a portion of the relatively fat absorbent liquid present in the bottom of the zone. Although the absorber settler is shown as one column with a simple gravity type settler in the bottom, it is apparent that the settler portion may be separate from the absorption zone. The upwardly flowing gas is then contacted in the upper portion of the absorber with downwardly flowing absorbent liquid introduced into the absorber via line 17.

The carbon dioxide-free treated gas is recovered overhead by means of line 15. The fat absorbent solution which forms two phases is permitted to settle and the relatively light fat amine phase, 5, is drawn off by means of line 19 and sent to the heated flash zone wherein the pressure on that portion of the fat absorbent is reduced and its temperature is raised to values approximating those conditions employed in the desorber, 27. Optionally, provided the temperature differential between the recycled lean solvent which is transported through line 45 and the relatively cool fat amine phase is sufficient to economically justify heat exchanger 51, heat exchange between lean solvent and fat amine phase is effected. Otherwise the lean solvent bypasses the heat exchanger 51, through line 53 and additional heat from some other conventional source is provided to heat up the fat amine phase. The vapor comprising some of the carbon dioxide and liquid recovered from the heated flasher zone (which may be comprised of any conventional flashing and heat exchange apparatus) are separately transported to the upper portion of the desorber via lines 23 and 25 respectively.

The heavier sulfone phase 7 is recovered as bottoms from the absorber settler and passed through line 9 to a simple flasher, 11, wherein the pressure on that phase is reduced to permit release of carbon dioxide which is sent to the desorber through line 13. The lean sulfone from the flasher in line 14 is then mixed directly with the lean amine solution flowing in line 45 obtained from the bottom of the desorber to partially cool the amine solution prior to introduction of the lean absorbent liquid through line 17 into the absorber settler. The lean solvent is usually cooled down to the absorber temperature by means of cooler 49.

In the desorber, the temperature and pressure conditions are maintained such that substantially all of the vaporous carbon dioxide is recovered overhead from line 37 after passing through line 29, condenser 33, and accumulator 35. Optionally the carbon dioxide may be wasted directly to the atmosphere through line 29. The water recovered from the accumulator may be reintroduced to the desorber through line 31. Also vapor generated in reboiler 43 to aid in stripping is preferably added to the bottom of the desorber via line 39.

The apparatus described in this figure and any employed in the process of the invention may be any conventional or convenient type known to those skilled in the art. Moreover, any other auxiliary equipment such as valves, by-passes, controlling devices, etc., that may be necessary for the proper operation of the process may be employed.

The invention is further illustrated, but not limited, by the following specific example of the inventive process based on a flow arrangement similar to that shown in the above-described drawing.

EXAMPLE

A gaseous mixture at a pressure of 252 pounds per square inch absolute and containing 17.54 mol percent carbon dioxide having the following approximate composition: carbon monoxide 0.55%, methane 0.28%, hydrogen 60.40%, nitrogen 19.53%, argon 0.25%, water 1.15% is introduced at a rate sufficient to provide about 760 mols per hour of carbon dioxide into an absorber settler zone having a bottom temperature of about 185° F.

The mixed absorbent liquid comprising 37% by weight monoethanolamine, 15% by weight water and the balance sulfolane is introduced into the top of the absorber settler at a temperature of about 100° F. at a rate of about 610 gallons per minute. An effluent product gas having less than about 0.7 mole $CO_2$ per hour (200 p.p.m.) is recovered in an amount sufficient to supply a typical 300 tons per day ammonia unit.

The desorber is operated at a bottoms temperature of about 245° F. and pressure of about 5 pounds per square inch gauge. The lean amine solution obtained from the bottoms of the desorber is cooled to 209° F. by addition of the lean sulfolane solution and further cooled to 100° F. by means of a heat exchanger employing cooling water. Total heat required to desorb the carbon dioxide is 59,500 B.t.u.'s per mole of carbon dioxide.

A similar process, except operating with an absorbent composition modified by substituting diisopropanolamine for monoethanolamine requires a total heat input of 76,500 B.t.u. per mol of carbon dioxide to achieve same desorption since it is required to circulate a somewhat greater total solvent flow (1085 gallon per minute) to the desorber.

I claim as my invention:

1. The process of separating carbon dioxide from a gaseous mixture containing initially from 15 to 50% by volume of carbon dioxide which comprises contacting said mixture in an absorption zone with a liquid absorbent composition comprising from 5 to 20 percent by weight water, from 15 to 60 percent by weight of ethanolamine selected from the group consisting of monoethanolamine, diethanolamine and mixtures thereof and the balance being a cyclotetramethylene sulfone under absorption conditions sufficient to produce an effluent product gas containing less than 2000 parts per million of carbon dioxide; recovering a fat absorbent composition from said absorption zone as two separate liquid phases, a fat amine phase and a fat sulfone phase; separately regenerating said phases by reducing the pressure on said fat sulfone phase to a pressure lower than that maintained in said absorption zone whereby a first reject effluent comprising carbon dioxide is released and a lean sulfone stream is obtained, and by both reducing the pressure to a pressure which is lower than that maintained in said absorption zone and adding heat to said fat amine phase to raise said phase to a temperature which is higher than said absorption zone whereby a second reject effluent comprising carbon dioxide is released and a lean amine stream is obtained; combining said lean amine and said lean sulfone streams; and recycling said combined stream to contact additional quantities of said gaseous mixture.

2. The process of claim 1 wherein said gaseous mixture is a sour natural gas.

3. The process of claim 1 wherein said gaseous mixture is a hydrogen synthesis gas.

4. The process of claim 1, wherein said gaseous mixture is a refinery gas.

5. The process of claim 1, wherein the cyclotetramethylene sulfone is sulfolane.

6. The process of claim 1 wherein said ethanolamine is monoethanolamine and is present in said absorbent composition in an amount of from 20 to 40% by weight.

7. The process of claim 1 wherein said ethanolamine is diethanolamine and is present in said absorbent composition in an amount of from 30 to 50% by weight.

8. The process of claim 1 wherein said absorption zone is operated at a pressure of from 0 to 1,000 pounds per square inch gauge, and a temperature of about 90 to 130° F.

9. The process of claim 8 wherein the temperature of said fat amine phase is raised to about 240 to 265° F. at a pressure of about 0 to 15 pounds per square inch gauge.

10. The process of claim 9 wherein the pressure of said fat sulfone phase is reduced to about 0 to 15 pounds per square inch gauge.

References Cited
UNITED STATES PATENTS

| 2,477,314 | 9/1949 | Scharmann | 23—2 |
| 3,039,251 | 6/1962 | Kamlet | 23—2 X |

EARL C. THOMAS, *Primary Examiner.*